United States Patent
Kritzner et al.

(10) Patent No.: US 12,449,506 B2
(45) Date of Patent: Oct. 21, 2025

(54) RADAR SYSTEM FOR INTERFERENCE AVOIDANCE BASED ON VEHICLE HEADING

(71) Applicant: Veoneer Sweden AB, Vargarda (SE)

(72) Inventors: Michael Kritzner, Niederwerrn (DE); Jonathan Moss, Unterschleissheim (DE); Andreas Lefevre, Niederwerrn (DE); Hansjerg Goelz, Unterschleissheim (DE); Martin Fuchs, Unterschleissheim (DE)

(73) Assignee: MAGNA ELECTRONICS SWEDEN AB, Vargarda (SE)

( * ) Notice: Subject to any disclaimer, the term of this patent is extended or adjusted under 35 U.S.C. 154(b) by 551 days.

(21) Appl. No.: 17/996,989

(22) PCT Filed: Apr. 22, 2021

(86) PCT No.: PCT/EP2021/060497
§ 371 (c)(1),
(2) Date: Oct. 24, 2022

(87) PCT Pub. No.: WO2021/219480
PCT Pub. Date: Nov. 4, 2021

(65) Prior Publication Data
US 2023/0130673 A1    Apr. 27, 2023

(30) Foreign Application Priority Data
Apr. 28, 2020    (EP) .................................... 20171805

(51) Int. Cl.
*G01S 7/02*    (2006.01)
*G01S 13/931*    (2020.01)

(52) U.S. Cl.
CPC ............ *G01S 7/023* (2013.01); *G01S 13/931* (2013.01)

(58) Field of Classification Search
CPC ............................... G01S 7/023; G01S 13/931
See application file for complete search history.

(56) References Cited

U.S. PATENT DOCUMENTS

| | | | | |
|---|---|---|---|---|
| 4,088,955 A | * | 5/1978 | Baghdady | ............... G01S 7/023 455/283 |
| 5,280,288 A | * | 1/1994 | Sherry | .................... G01S 13/38 342/159 |

(Continued)

FOREIGN PATENT DOCUMENTS

| | | |
|---|---|---|
| CN | 107076845 A | 8/2017 |
| EP | 3244229 A1 | 11/2017 |
| GB | 2299722 A | 10/1996 |

OTHER PUBLICATIONS

International Search Report and Written Opinion of PCT/EP2021/060497, mailed on Jul. 21, 2021.

*Primary Examiner* — Peter M Bythrow
(74) *Attorney, Agent, or Firm* — DICKINSON WRIGHT PLLC

(57) ABSTRACT

A radar system (201) for a vehicle (200), comprising a control unit (203) and a radar transceiver arrangement (202) with at least one ego radar transceiver (204), where, for the at least one ego radar transceiver (204), the control unit (203) is adapted to: determine a present direction (D, $D_A$) of the ego radar transceiver (204), determine a reserved frequency band (B0) corresponding to the present direction (D, $D_A$), and to determine a first extended frequency band (B1) comprising and extending beyond the reserved frequency band (B0), wherein the control unit is further adapted to: detect presence of an interfering radar transceiver in the first extended frequency band, and operating the ego radar transceiver (204) in the first extended frequency band (B1) in case an interfering radar transceiver is not detected in the first extended frequency band and operating the ego radar (Continued)

transceiver (204) in the reserved frequency band (B0) otherwise.

15 Claims, 5 Drawing Sheets

(56) References Cited

U.S. PATENT DOCUMENTS

| | | | | |
|---|---|---|---|---|
| 5,294,933 | A * | 3/1994 | Lee | G01S 13/90 342/201 |
| 5,497,162 | A * | 3/1996 | Kaiser | G01S 7/023 342/147 |
| 7,496,368 | B2 * | 2/2009 | Zimmermann | H04W 16/14 455/63.1 |
| 7,605,745 | B2 * | 10/2009 | Honda | G01S 13/345 342/159 |
| 7,898,344 | B2 | 3/2011 | Hongo | |
| 10,656,242 | B2 | 5/2020 | Farhoud et al. | |
| 10,830,867 | B2 * | 11/2020 | Lin | G01S 13/86 |
| 11,275,174 | B2 * | 3/2022 | Smith | G01S 7/023 |
| 2005/0192016 | A1 * | 9/2005 | Zimmermann | H04W 16/14 455/450 |
| 2007/0120731 | A1 * | 5/2007 | Kelly | G01S 7/021 342/159 |
| 2008/0061891 | A1 * | 3/2008 | Hongo | G01S 7/35 327/156 |
| 2008/0106458 | A1 * | 5/2008 | Honda | G01S 7/023 342/59 |
| 2016/0238694 | A1 * | 8/2016 | Kishigami | G01S 7/0233 |
| 2017/0219690 | A1 * | 8/2017 | Farhoud | G01S 7/03 |
| 2019/0056476 | A1 * | 2/2019 | Lin | G01S 7/021 |
| 2020/0393536 | A1 * | 12/2020 | Stettiner | G01S 13/343 |
| 2020/0408891 | A1 * | 12/2020 | Brett | G01S 7/0235 |
| 2021/0055413 | A1 * | 2/2021 | Engewald | H04B 1/0483 |
| 2022/0390583 | A1 * | 12/2022 | Himmelstoss | G01S 7/0236 |

* cited by examiner

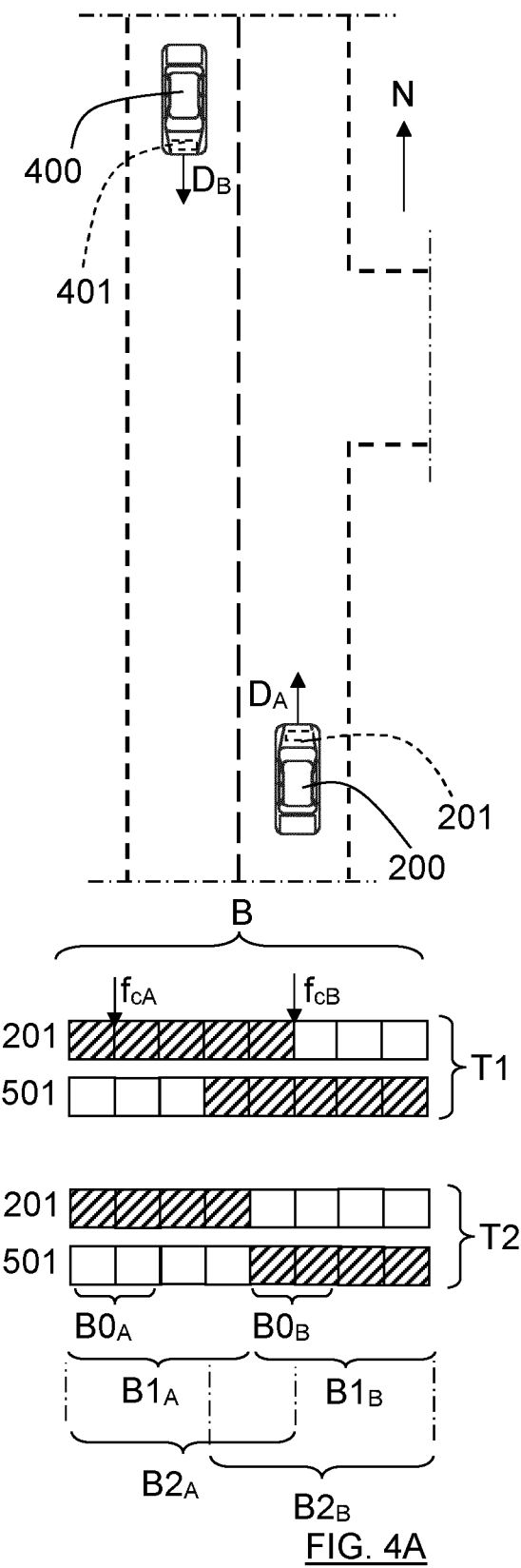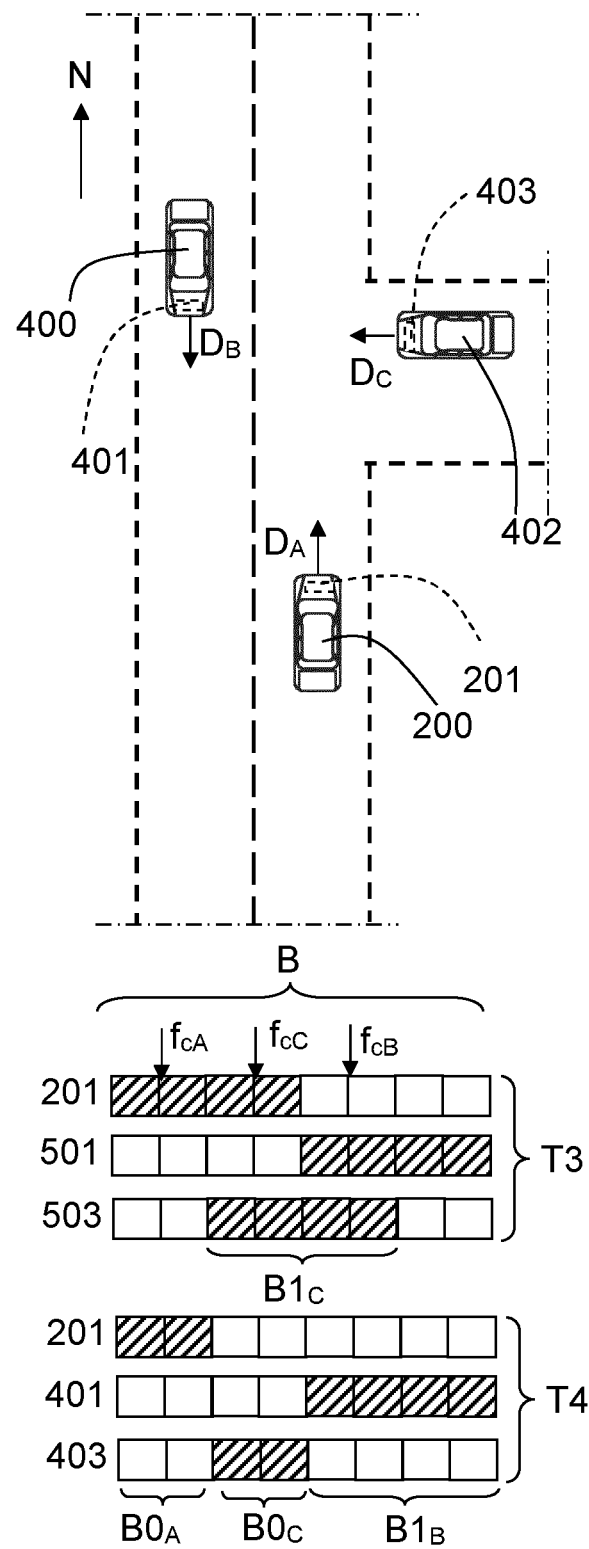
FIG. 4A
FIG. 4B

RADAR SYSTEM FOR INTERFERENCE AVOIDANCE BASED ON VEHICLE HEADING

CROSS-REFERENCE TO RELATED APPLICATIONS

This application is a 35 U.S.C. § 371 national phase of PCT International Application No. PCT/EP2021/060497, filed Apr. 22, 2021, which claims the benefit of priority under 35 U.S.C. § 119 to European Patent Application No. EP 20171805.3, filed Apr. 28, 2020, the contents of which are incorporated herein by reference in their entirety.

FIELD OF THE DISCLOSURE

The present disclosure relates to radar systems adapted for automotive applications. There are disclosed radar systems and methods for operating radar systems.

BACKGROUND

A radar transceiver is, normally, a device arranged for transmission and reception of radar signals in a dedicated radar frequency band. Radar transceivers are commonly used in vehicles for monitoring vehicle surroundings. Automatic Cruise Control (ACC) functions, Emergency Braking (EB) functions, Advanced Driver Assistance Systems (ADAS) and Autonomous Drive (AD) are some examples of applications where radar data represents an important source of information on which vehicle control is based.

Many of the dedicated automotive radar frequency bands allow uncoordinated transmission, which means that two or more radar transceivers may transmit at the same time in the same frequency band, and thus interfere with each other.

EP 3244229 discloses general effects of interference on a frequency modulated continuous wave (FMCW) radar system, and methods to repair an interfered radar signal.

Despite the often impressive efficiency of previously proposed repair methods, there is a need for further improvements in vehicular radar systems in order to reduce interference, and possibly to provide a lower cost means of avoiding interference for radars.

SUMMARY

It is an object of the present disclosure to provide improved radar systems where interference is reduced or removed entirely, compared to known vehicular radar systems, such as uncoordinated automotive radar based on uncoordinated FMCW transmission.

This object is obtained by a radar system for a vehicle. In one exemplary environment, the radar system comprises a control unit and a radar transceiver arrangement with at least one ego radar transceiver, where, for the at least one ego radar transceiver, the control unit is adapted to determine a present direction of the ego radar transceiver in dependence of a vehicle heading, determine a reserved frequency band corresponding to the direction, and to determine a first extended frequency band comprising and extending beyond the reserved frequency band. The control unit is further adapted to detect presence of an interfering radar transceiver, and to operate the ego radar transceiver in the first extended frequency band in case an interfering radar transceiver is not detected during operation of the ego radar transceiver in the first extended frequency band and to operate the ego radar transceiver in the reserved frequency band otherwise.

This way the radar system can be protected from interference generated by other radar transceivers in vicinity of the ego radar transceiver. The interfering radar transceivers are also protected since the ego radar transceiver backs off to the reserved frequency band once other radar transceivers operating within the first frequency band are detected.

According to aspects of an exemplary embodiment of the present invention, the control unit is further adapted to determine a second extended frequency band comprising and extending beyond the first extended frequency band, and to operate the ego radar transceiver in the second extended frequency band in case an interfering radar transceiver is not detected while operating the ego radar transceiver in the second extended frequency band and to operate the ego radar transceiver in the first extended frequency band or in the reserved frequency band otherwise.

Thus, the operating frequency band of the ego radar transceiver is potentially expanded when no interfering radar transceivers are detected, and the ego radar transceiver backs off to a smaller frequency band once other radar transceivers are detected operating in the first and/or in the second frequency band. This means that the operating bandwidth is extended during periods of time when no interfering radar transceivers are present in vicinity of the ego radar transceivers. This is an advantage since the increased bandwidth leads to, e.g., an improved distance resolution.

According to aspects of an exemplary embodiment of the present invention, the first extended frequency band and the second extended frequency band excludes a reserved frequency band corresponding to a direction opposite to the present direction.

Thus, two radar transceivers directly facing each other are always able to back off to a reserved frequency band where the other radar transceiver does not transmit. Thus, the often severe interference resulting when radar transceivers directly face each other is avoided by the herein disclosed techniques.

According to aspects of an exemplary embodiment of the present invention, the control unit is adapted to generate a random outcome, and to detect presence of the interfering radar transceiver during operation in the first extended frequency band and/or in the second extended frequency band in dependence of the random outcome.

Thus, optionally, the ego radar transceiver does not automatically back off once the presence of another radar transceiver in vicinity of the ego radar transceiver has been determined. Instead, the ego radar transceiver backs off with a given probability, similar to a random back-off mechanism used in communication systems based on carrier sense multiple access (CSMA) principles. This means that both the ego radar transceiver and the interfering radar transceiver does not necessarily need to back off from an extended frequency band mode of operation, which is an advantage.

According to aspects of an exemplary embodiment of the present invention, the ego radar transceiver is configured to avoid radar transmission at the same frequency and time instant as the interfering radar transceiver. The control unit is adapted to detect presence of the interfering radar transceiver in the first extended frequency band and/or in the second extended frequency band in dependence of an interference level in a received radar signal of the ego radar transceiver. Some radar transceivers are able to detect the presence of an ongoing radar sensing operation, and to paus transmission until the other radar transmission is concluded.

According to aspects of an exemplary embodiment of the present invention, the reserved frequency band is determined based on a center frequency corresponding to the direction and on a pre-configured reserved bandwidth.

This method of defining the reserved frequency band is simple to implement, since it only requires determining a direction and consulting, e.g., a look-up table or evaluating a simple function of direction.

According to aspects of an exemplary embodiment of the present invention, the control unit is adapted to detect presence of an interfering radar transceiver by monitoring a received radar signal of the ego radar transceiver.

This method of detecting presence of an interfering radar transceiver is robust and independent of the modulation and other characteristics of the interfering radar transceiver. For instance, the received radar signal of the ego radar transceiver can be monitored in terms of noise floor or difference between consecutive time domain samples of the received radar signal.

According to aspects of an exemplary embodiment of the present invention, the control unit is adapted to perform signal repair of the received radar signal and/or to have a slanted polarization direction of the radar transceiver. This reduces the impact of interference, which is an advantage.

According to aspects of an exemplary embodiment of the present invention, the control unit is adapted to determine a present direction by use of Global Navigation Satellite System (GNSS) data, and/or by an electronic compass comprised in the radar system. Thus, the determining of present direction can be implemented in a low cost yet robust manner, which is an advantage.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise.

The steps of any method disclosed herein do not have to be performed in the exact order disclosed, unless explicitly stated. Further features of, and advantages with, the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

The present disclosure will now be described in more detail with reference to the appended drawings, where FIG. 1 schematically illustrates a traffic scenario;
FIG. 4A-4B schematically illustrate traffic scenarios.

DETAILED DESCRIPTION OF EXEMPLARY EMBODIMENTS OF THE PRESENT INVENTION

Figure 1:
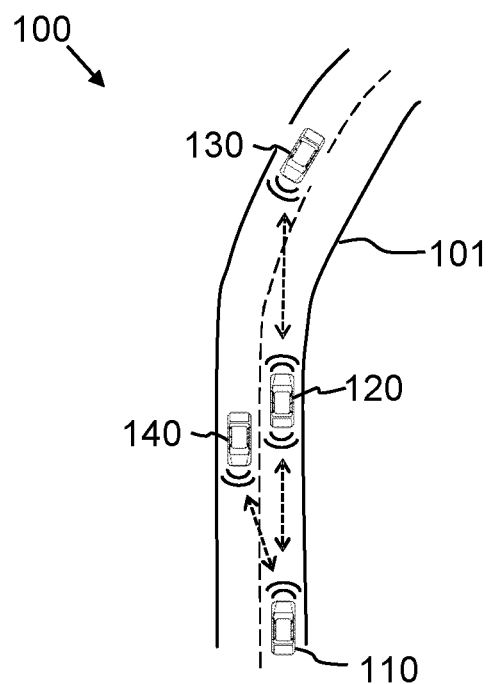

Aspects of embodiments of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the disclosure. As used herein, the singular forms "a", "an" and "the" are intended to include the plural forms as well, unless the context clearly indicates otherwise.

FIG. 1 shows a traffic scenario 100 where vehicles 110, 120, 130, 140 travel on a road 101. Each vehicle comprises one or more radar transceivers that transmit in a common frequency band in an uncoordinated manner, which means that radars may interfere with each other.

In FIG. 1, the front radar transceivers of vehicle 120 and vehicle 130 may generate interference to each other, as well as the front radar transceivers of vehicle 110 and vehicle 140. Vehicle 120 also comprises rearward looking corner radar transceivers which may interfere with, e.g., the front radar transceiver of vehicle 110. The type of 'head-on' interference generated between, e.g., vehicles 110 and 140 is normally severe, since the interference is along a direction associated with high antenna gain on both transmit and receive sides. Interference generated between radar transceivers at an angle is normally less severe.

Figure 2:
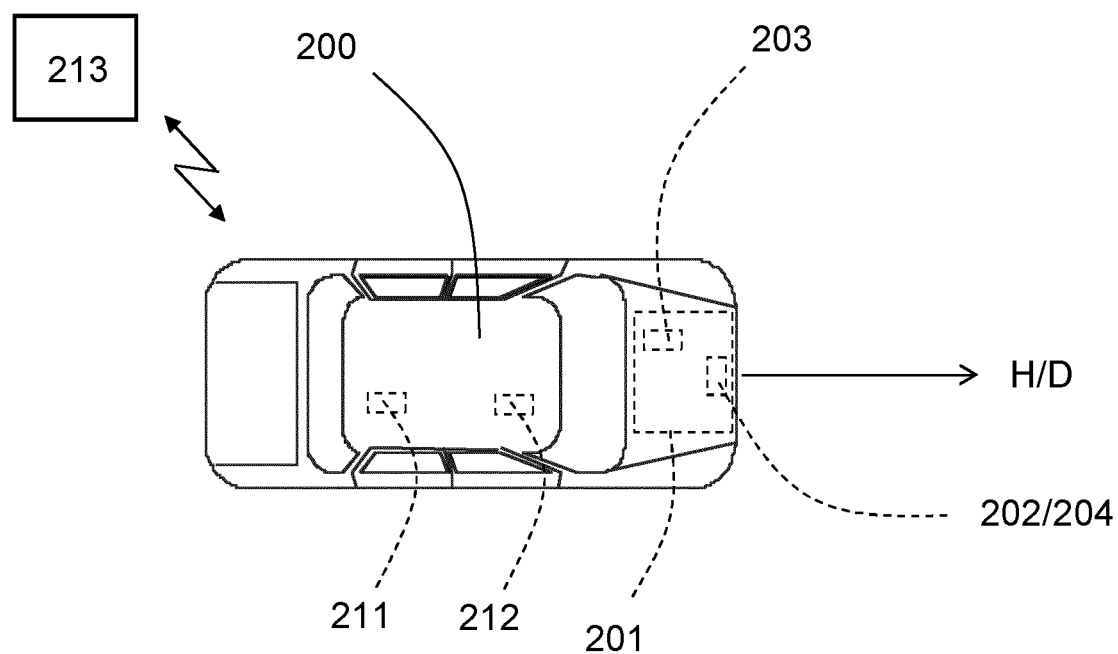
FIG. 2 schematically shows a top view of a vehicle.

As shown in FIG. 2, there is an ego vehicle 200 associated with a heading H. The vehicle 200 comprises a radar system 201 that in turn comprises a radar transceiver arrangement 202 and a control unit 203. The radar transceiver arrangement 202 comprises at least one ego radar transceiver 204 associated with a boresight direction D.

The control unit 203 is adapted to determine the direction D of the ego radar transceiver 204 in dependence of the vehicle heading H. The vehicle heading H and thus also the direction D may be determined, e.g., by a Global Navigation Satellite System (GNSS) and/or by an on-board electronic compass.

The radar transceiver arrangement 202 is adapted to operate within a certain overall radar frequency band B, such as for example a 76-81 GHz frequency band. This band may furthermore be divided into a 76-77 GHz part and a 77-81 GHz part which parts may be associated with different limits on transmitted power, e.g., in terms of Equivalent Isotropically Radiated Power (EIRP). The radar transceiver arrangement 202 may comprise one or more radar transceivers 204.

In the following, the radar transceiver arrangement 202 is assumed to comprise an ego radar transceiver 204 with boresight direction D, i.e., aligned with the heading H of the vehicle 200. It is, however, appreciated that the present techniques are applicable to any type of vehicle radar, such as a sideward looking radar with boresight direction 90 degrees offset with respect to the vehicle heading H, or a rearward looking radar with boresight direction opposite to the vehicle heading H.

A radar transceiver fixedly arranged on a vehicle is thus associated with a direction that can be determined in dependence of the vehicle heading. The direction of a radar transceiver, i.e., its boresight direction, changes with the heading of the vehicle. Thus, if the vehicle heads north, the direction of a front radar is also north, while the direction of a rearward looking radar on the vehicle heading north is instead south.

To avoid interference between radar transceivers on different vehicles, it is proposed herein to adjust a frequency band of operation associated with the ego radar transceiver in dependence of the direction D. A reserved frequency band B0 is determined based on a center frequency $f_c$ corresponding to the direction and on a pre-configured reserved bandwidth. The reserved bandwidth may, e.g., be on the order of 1 GHz. Thus, a direction of a radar transceiver is associated with a respective center frequency. This way, it can be assured that two front radar transceivers facing each other uses different reserved frequency bands, since they are directed in opposite directions, thereby avoiding the severe heads-on interference discussed above.

However, as long as there are no other radar transceivers in vicinity of the ego radar transceiver, the ego radar transceiver is allowed to operate in an extended frequency band comprising but extending beyond the reserved frequency band corresponding to the direction of the radar transceivers. When an interfering radar transceiver is detected, the frequency band of operation can be reduced back to the reserved frequency band where at least head-on interference is not present.

Figure 3:
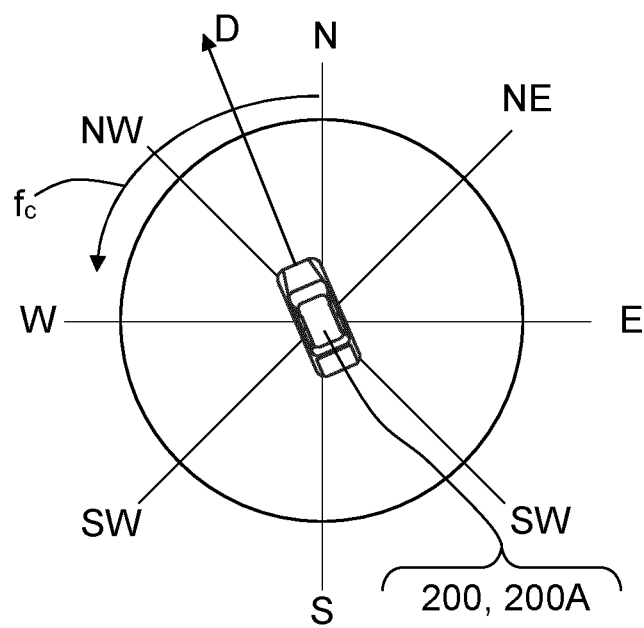
FIG. 3 schematically shows a top view of a vehicle with direction in cardinal directions.

With reference also to FIG. 3, in a general case, the control unit 203 is adapted to define the present vehicle heading (and thus also the direction D of the ego radar) with respect to a fixed reference direction such as the magnetic north N. As the vehicle heading changes in relation to the fixed reference direction N, a center frequency $f_c$ for the reserved frequency band B0 changes correspondingly. This means that there are certain different center frequencies $f_c$ for different angles with respect to the fixed direction N all the way around for a full turn of 360°.

According to some aspects of an exemplary embodiment of the present invention, the center frequency $f_c$ is given as a linear function of the direction D. Thus, for example, a direction of zero degrees with respect to magnetic north may correspond to a center frequency of 76.5 GHz, which then linearly increases up to a center frequency of 78.5 GHz for a direction of 180 degrees with respect to magnetic north, and then continues up to a direction of 360 degrees with respect to magnetic north.

According to other aspects of an exemplary embodiment of the present invention, the center frequency $f_c$ is given as a piecewise constant function of the direction D, $D_A$. In this case the center frequency is constant over a range of directions, and then changes to another constant value if the direction goes outside of the range of directions. Some hysteresis may be warranted in order to avoid rapid fluctuations of the center frequency.

According to some further aspects of an exemplary embodiment of the present invention, the center frequency $f_c$ is adapted to run through the overall radar frequency band B for a full turn of 360°. According to some aspects, the center frequency $f_c$ is adapted to change step-wise where the full turn of 360° is divided into direction intervals which divide the full turn interval 0°-360° into sections, where a certain center frequency $f_c$ is assigned a certain direction interval. The direction intervals are preferably relatively small, typically between 1° and 5°.

In an example shown in FIG. 4A, with continued reference to FIG. 3, the ego vehicle, here also being referred to as a first vehicle 200, is travelling in a northwardly direction N, and the ego radar transceiver 204 is directed in direction $D_A$ aligned with the vehicle heading. This direction corresponds to a reserved band $B0_A$ center frequency $f_{cA}$.

The frequency bands within the overall radar frequency band B that are presently assigned are marked with diagonal lines in FIG. 4A, and in the following FIG. 4B as well.

Here, at a first time instant T1, the ego radar transceiver 204 is assigned a second extended frequency band $B2_A$.

An interfering radar transceiver 401 arranged on a second vehicle 400 is approaching the first vehicle 200, travelling in a southward direction S. The interfering radar transceiver 401 has a boresight direction $D_B$ aligned with the vehicle heading. This direction corresponds to a reserved band $B0_B$ center frequency $f_{cB}$ as indicated in FIG. 4A. At the first time instant T1, the second radar transceiver 401 is assigned a second extended frequency band $B2_B$ that comprises the center frequency $f_{cB}$.

At the first time instant T1, there is a part of the first extended frequency bands $B2_A$, $B2_B$ that is common for the first radar transceiver 204 and the second radar transceiver 401. The present frequency assignment is maintained as long as no interfering radar transceiver is detected according to the methods disclosed herein.

At a second time instant T2, following the first time instant T1, an interfering radar transceiver has been detected by both radar transceivers 204, 401, and the frequency assignment is therefore altered. In particular, both radar transceivers have backed off to respective first extended frequency bands $B1_A$, $B1_B$. These first extended frequency bands are no longer overlapping, which means that the two radar transceivers 201, 401 are no longer detectable, i.e., the radar transceiver 201 cannot see the radar transceiver 401 and vice versa. Thus, the two radar transceiver maintain operation in the first extended frequency bands.

In this way, interference can be mitigated without any further communication between the two vehicles.

With reference to FIG. 4B, an interfering third vehicle 402 comprising a radar transceiver 403 is approaching the first vehicle 200, travelling in a westward direction W. The radar transceiver 403 on the third vehicle 402 is facing in direction $D_C$, which corresponds to a reserved band center frequency $f_{cC}$.

At a third time instant T3, the radar transceiver 403 is assigned a first extended frequency band $B1_C$. The first extended frequency band $B1_C$ overlaps with both the first extended frequency band $B1_A$ and the first extended frequency band $B1_B$. This frequency assignment is maintained as long as no interfering radar transceivers are detected by any of the control units.

At a fourth time instant T4, following the third time instant T3, interfering radar transceivers are detected by all control units. The radar transceivers of vehicles 200 and 402 are backed off all the way to the reserved frequency bands $B0_A$, $B0_C$, while the radar transceiver 401 is backed off to the first extended frequency band $B1_B$, where no interfering radar transceiver is detected. There are now no overlapping frequency bands that may cause interference.

The above example illustrates how the frequency band assignments of the first radar transceiver 204 and the second radar transceiver 401 are altered, at the second time instant T2, and how the frequency band assignments of the first radar transceiver 204 and the third radar transceiver 403 are altered at the fourth time instant T4, while the second radar transceiver 401 maintains its frequency band assignment. This is an example of how an adaptation of the frequency band assignment can be performed for all vehicles involved, and also only for some vehicles involved, with static rules and without communication between vehicles.

It is for example conceivable that only the first radar transceiver 204 adapts the frequency band assignment at the second time instant T2, while the second radar transceiver 401 maintains its sub-band assignment. The vehicles may of course enter situations with other frequency band assignments. The frequency band assignments presently used is dependent on previous events.

Figure 5:
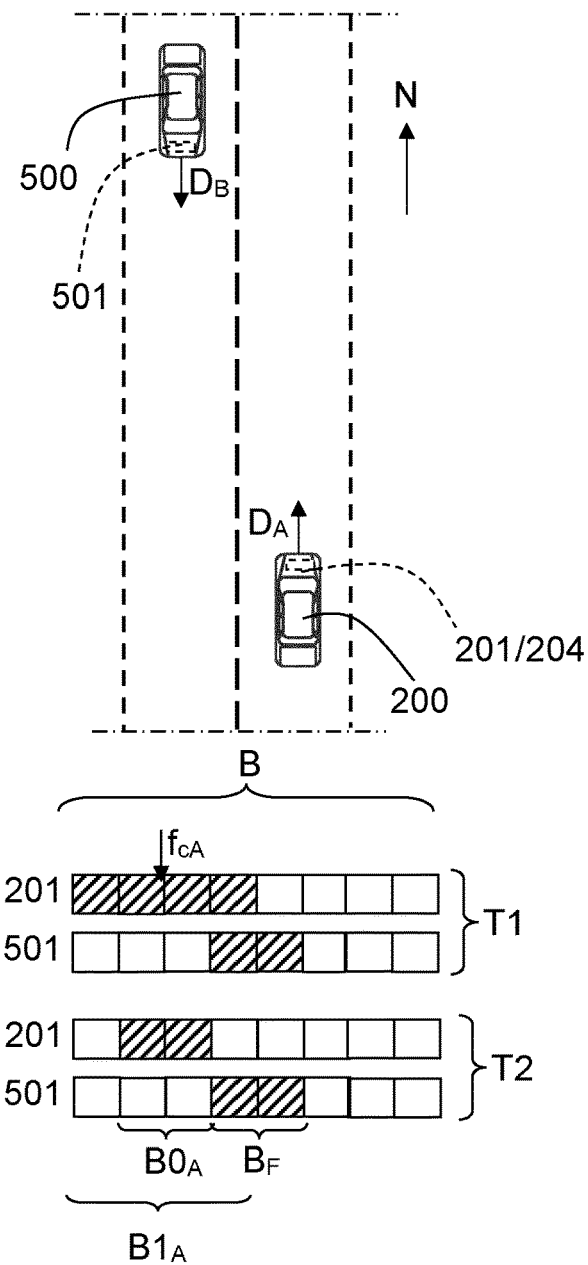
FIG. 5 schematically illustrates a traffic scenario.

In FIG. 5 another example where vehicle 200 is travelling north and comprises an ego radar transceiver 204 directed in direction $D_A$ (also north). Another vehicle 500 is travelling south with a radar transceiver 501 directed in direction $D_B$ (south). This vehicle 500 is a legacy vehicle which does not implement any of the herein disclosed interference mitigation methods. At a first time instant T1, the ego radar transceiver 204 is assigned its first extended frequency band $B1_A$, while the legacy operation radar 501 uses the fixed band $B_F$ which overlaps with the first extended frequency band $B1_A$. The ego radar transceiver 204 detects presence of an interfering radar transceiver while operating in the first extended frequency band $B1_A$, which prompts a back-off by the ego radar transceiver to the reserved frequency band $B0_A$.

Thus interference from and to legacy radars can be reduced.

According to some aspects of an exemplary embodiment of the present invention, the reserved frequency bands $B0_A$, $B0_B$, $B0_C$ are not intended to be subject to any further frequency band reduction but represents a basic frequency band assignment from which no further adaptations are made.

However if the initial band is interfered the non-interfered parts of the extended band may be used. In the example FIG. 4A and FIG. 4B, the overall radar frequency band B can comprise four reserved frequency bands, according to some further aspects one for each cardinal direction north, east, south and west, for example having a bandwidth of 1 GHz each in case the overall radar frequency band B has a bandwidth of 4 GHz.

The overall radar frequency band B can of course be divided into more reserved frequency bands. In this way, for a complete full turn of 360°, all of the overall radar frequency band B will be used. As mentioned, other fixed directions than the cardinal directions can of course be used.

In the example described, the overall radar frequency band B has been divided into 8 blocks for purposes of describing the present disclosure. According to some aspects, the overall radar frequency band B is divided into a number of equal frequency sub-bands such that a frequency raster is obtained, for example 50×100 MHz. When a frequency re-assignment is performed, it is chosen which of the frequency sub-bands to use, rather than defining arbitrary start and stop frequencies.

According to some aspects of an exemplary embodiment of the present invention, the top and bottom ends of the overall radar frequency band B are often un-occupied, except for the case when roads point exactly north.

In the examples of FIGS. 4A and 4B, the first extended frequency bands B1A, B1B, B1C are shown to be of equal bandwidth and the second extended frequency bands B2A, B2B are also shown to be of equal bandwidth. This is of course not necessary, the present disclosure relates to reducing and increasing bandwidths in view if determined interference, where there is a reserved frequency band having a certain bandwidth and representing a basic frequency band as discussed above.

The above has been described for a radar transceiver arrangement 202 that comprises one forward-looking radar transceiver 204. According to some aspects, the present disclosure can be applied for a radar transceiver arrangement 202 that comprises two or more radar transceivers. In this case, the reserved frequency band assignment is dependent on where each radar transceiver has its boresight direction as discussed above. For example, a rear-looking radar transceiver in the radar transceiver arrangement 202 of the first radar system 201 could have the same reserved frequency band assignment as the second radar transceiver 401 in the second vehicle 400, the second radar transceiver 401 having a boresight direction that corresponds to the second direction $D_B$.

When there is interference, this can be alleviated by conventional interference cancelling and signal repair methods, such as for example by means of the repair method described in EP 3244229. The usage of, for example, at least one of slant polarizations, scheduling, and CDMA (Code-division multiple access) techniques can also be used to counteract interference. Two front radars having a slant antenna polarization of +45° which face each other will have mutually orthogonal polarizations. As large frequency bands are used as long as the conventional interference cancelling, and signal repair methods are sufficient for mitigating the interference in the initial band of other radar sensors.

Interference can also be caused by other vehicles that are not equipped according to the present disclosure, and then interference can be alleviated by conventional interference cancelling methods, such as for example by means of the repair method described in EP 3244229.

To summarize, there has been disclosed herein a radar system 201 for a vehicle 200. The system comprises a control unit 203 and a radar transceiver arrangement 202 with at least one ego radar transceiver 204, where, for the at least one ego radar transceiver 204, the control unit 203 is adapted to determine a present direction D, $D_A$ of the ego radar transceiver 204 in dependence of a heading of the vehicle 200. The control unit is also adapted to determine a reserved frequency band B0 corresponding to the present direction D, $D_A$ and to determine a first extended frequency band B1 comprising and extending beyond the reserved frequency band B0.

The reserved frequency band represents a frequency band which can be used without being interfered by another radar transceiver facing in a direction opposite to the direction D, i.e., having a boresight direction opposite to the boresight direction of the ego radar transceiver 204.

The first extended frequency band allows operating the radar transceiver at a larger bandwidth in order to, e.g., improve distance resolution of the radar system 201 compared to when operating only in the reserved frequency band. However, the risk of severe interference is larger when operating in the extended frequency band.

The control unit 203 is further adapted to detect presence of an interfering radar transceiver 401, 402, and to operate the ego radar transceiver 204 in the first extended frequency band B1 in case an interfering radar transceiver is not detected during operation of the ego radar transceiver 204 in the first extended frequency band B1 and to operate the ego radar transceiver 204 in the reserved frequency band B0 otherwise.

Thus, when an interfering radar transceiver is detected, the operation of the ego radar transceiver is backed off from the extended frequency band into the reserved frequency band. As will be discussed in more detail below, the detection of an interfering radar transceiver may optionally be conditioned on additional mechanisms, such as the generation of a random outcome similar to the operation of a random back-off mechanism. The detection may also be conditioned on the ability of the ego radar transceiver to avoid radar transmission at the same frequency and time instant as the interfering radar transceiver.

According to some aspects of an exemplary embodiment of the present invention, the control unit 203 is adapted to detect presence of an interfering radar transceiver 401, 402 by monitoring a received radar signal of the ego radar transceiver 204.

According to some such aspects of an exemplary embodiment of the present invention, the control unit 203 is adapted to detect presence of an interfering radar transceiver 401, 402 by measuring a noise floor level associated with the received signal.

According to other such aspects of an exemplary embodiment of the present invention, the control unit 203 is adapted to detect presence of an interfering radar transceiver 401, 402 based on a difference between consecutive time domain samples of the received radar signal.

According to aspects of an exemplary embodiment of the present invention, the control unit 203 is further adapted to determine a second extended frequency band B2 comprising and extending beyond the first extended frequency band B1, and to operate the ego radar transceiver 204 in the second extended frequency band B2 in case an interfering radar transceiver is not detected while operating the ego radar transceiver 204 in the second extended frequency band B2 and to operate the ego radar transceiver 204 in the first extended frequency band B1 or in the reserved frequency band B0 otherwise.

The radar system may optionally be allowed to operate at bandwidths between the first extended frequency band and the second extended frequency band, and to back off in steps down to the reserved frequency band. Of course, more than two levels of extended frequency bands may be envisioned. The ego radar transceiver is then allowed to operate in a larger bandwidth channel, which is then successively reduced down to the reserved channel as long as an interfering radar transceiver is detected until the interfering radar transceiver is no longer detected.

According to aspects of an exemplary embodiment of the present invention, the first extended frequency band B1 and the second extended frequency band B2 excludes a reserved frequency band corresponding to a direction $D_B$ opposite to the present direction D, $D_A$. This means that a radar transceiver operating only in its reserved frequency band will not suffer from significant levels of interference from radar transceivers facing in a direction opposite to the direction of the radar transceiver, even if these radar transceivers are operating in an extended frequency band. This was discussed above in connection to FIGS. 4A and 4B.

It is unnecessary perhaps that both interfering radar transceivers back off to their respective reserved frequency bands. In most cases it may be enough if one of the radar transceivers performs the back-off to the reserved frequency band while to other radar transceiver maintains operation in the extended frequency band. A potential solution to make the overall system more efficient is to implement a mechanism similar to the random back-off mechanism implemented in many communication systems based on carrier sense multiple access (CSMA).

In these systems the transceivers, upon sensing the presence of another radar transceiver, generates a random outcome, i.e., a realization of a random variable, and performs the back-off depending on the random outcome. For instance, a random value can be generated and back-off only perform if the random value is above some threshold. Thus, the back-off is only performed with some probability.

In other words, according to aspects of an exemplary embodiment of the present invention, the control unit 203 is adapted to generate a random outcome, and to detect presence of the interfering radar transceiver 401, 402 during radar operation in the first extended frequency band B1 and/or in the second extended frequency band B2 in dependence of the random outcome.

For an FMCW system, interference occurs when two or more radar signals are close together in frequency for a period of time, specifically within the intermediate frequency (IF) receiving bandwidth of each other or cross each other in frequency. The net effect is that the time domain signal, i.e., the raw data or digitally sampled signal obtained after frequency down-conversion of the received radio frequency signal, experiences a burst of interference, which may be high compared to the wanted radar-return signal. There may be multiple interference bursts within a short time window.

In the case of two FMCW radar transmitters, it is possible to detect presence of another ongoing chirp, and to paus radar transmission by the ego radar transceiver as the other chirp passes the transmitted chirp. This way the other radar transceiver is protected from interference. If the ego radar transceiver has this ability, then the interfering radar transceiver is protected without the ego radar transceiver having to back off from an extended frequency band of operation. Backing off to the first extended frequency band or to the reserved frequency band is then only required if the interfering radar transceiver generates too much interference to the ego radar transceiver.

According to aspects of an exemplary embodiment of the present invention, the ego radar transceiver 204 is configured to avoid radar transmission at the same frequency and time instant as the interfering radar transceiver 401, 402, wherein the control unit 203 is adapted to detect presence of the interfering radar transceiver 401, 402 in the first extended frequency band B1 and/or in the second extended frequency band B2 in dependence of an interference level in a received radar signal of the ego radar transceiver. For example, this type of operation can be obtained by a method comprising transmitting a radar signal at a frequency F(t) (such as an FMCW chirp signal) and receiving a reflected radar signal while monitoring frequencies adjacent to the frequency F(t) for interference. If interference is detected in the adjacent frequencies, radar transmission is paused for the cross-over time duration. The cross-over time duration may be estimated by observing the interfering signal prior to it appearing within the intermediate frequency (IF) bandwidth or determined by monitoring it as it traverses across the IF bandwidth. This way interference to both the radar transceiver and the interfering radar transceiver is avoided, which is an advantage. The method can be used both to mitigate interference from legacy radar transmitters, and also to mitigate interference experienced by legacy radar transceivers.

According to aspects of an exemplary embodiment of the present invention, the control unit 203 is adapted to perform signal repair of the received radar signal and/or to have a slanted polarization direction of the radar transceiver 204. Both signal repair methods and slanted polarization direction are known and will therefore not be discussed in more detail herein.

According to some aspects of an exemplary embodiment of the present invention, the control unit 203 is adapted to keep track of the ego vehicle's orientation and heading by means of compass data obtained by a compass device 211 and/or a Global Navigation Satellite System (GNSS) device 212 of any suitable kind. According to some aspects, the control unit 203 is adapted to keep track of the ego vehicle's orientation by means of map data acquired from a GNSS device of any suitable kind. The map data can be used for determining a road main extension that is used for determining the ego vehicle's orientation.

Figure 6:
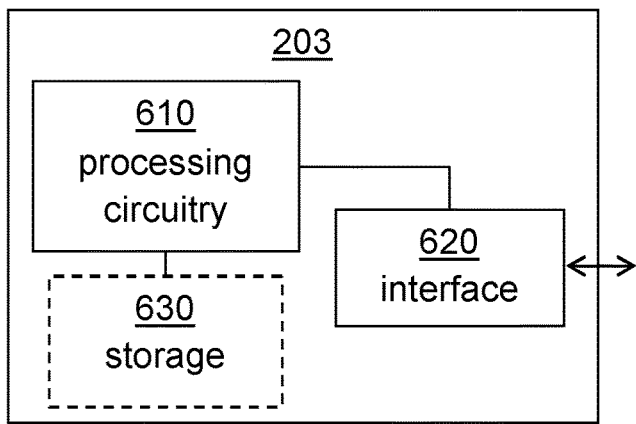
FIG. 6 schematically illustrates a control unit.

FIG. 6 schematically illustrates, in terms of a number of functional units, the components of the control unit 203 according to an embodiment. Processing circuitry 610 is provided using any combination of one or more of a suitable central processing unit (CPU), multiprocessor, microcontroller, digital signal processor (DSP), dedicated hardware accelerator, etc., capable of executing software instructions stored in a computer program product, e.g. in the form of a storage medium 630. The processing circuitry 610 may further be provided as at least one application specific integrated circuit (ASIC), or field programmable gate array (FPGA).

Particularly, the processing circuitry 610 is configured to cause the control unit 203 to perform a set of operations, or steps. These operations, or steps, were discussed above in connection to the various radar transceivers and methods. For example, the storage medium 1030 may store the set of operations, and the processing circuitry 610 may be configured to retrieve the set of operations from the storage medium 630 to cause the control unit 203 to perform the set of operations. The set of operations may be provided as a set of executable instructions. Thus, the processing circuitry 610 is thereby arranged to execute methods and operations as herein disclosed.

The storage medium 630 may also comprise persistent storage, which, for example, can be any single one or combination of magnetic memory, optical memory, solid state memory or even remotely mounted memory.

The control unit 203 may further comprise a communications interface 620 for communications with at least one other unit. As such, the radar interface 620 may comprise one or more transmitters and receivers, comprising analogue and digital components and a suitable number of ports for wired or wireless communication.

The processing circuitry 610 is adapted to control the general operation of the control unit 203 e.g. by sending data and control signals to the external unit and the storage medium 630, by receiving data and reports from the external unit, and by retrieving data and instructions from the storage medium 630. Other components, as well as the related functionality, of the control unit 203 are omitted in order not to obscure the concepts presented herein.

Figure 7:
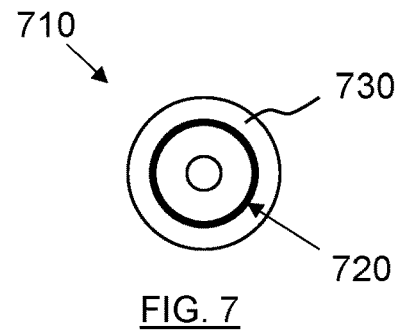
FIG. 7 shows an example computer program product.

FIG. 7 shows a computer program product 610 comprising computer executable instructions 620 arranged on a computer readable medium 630 to execute any of the methods disclosed herein.

Figure 8:
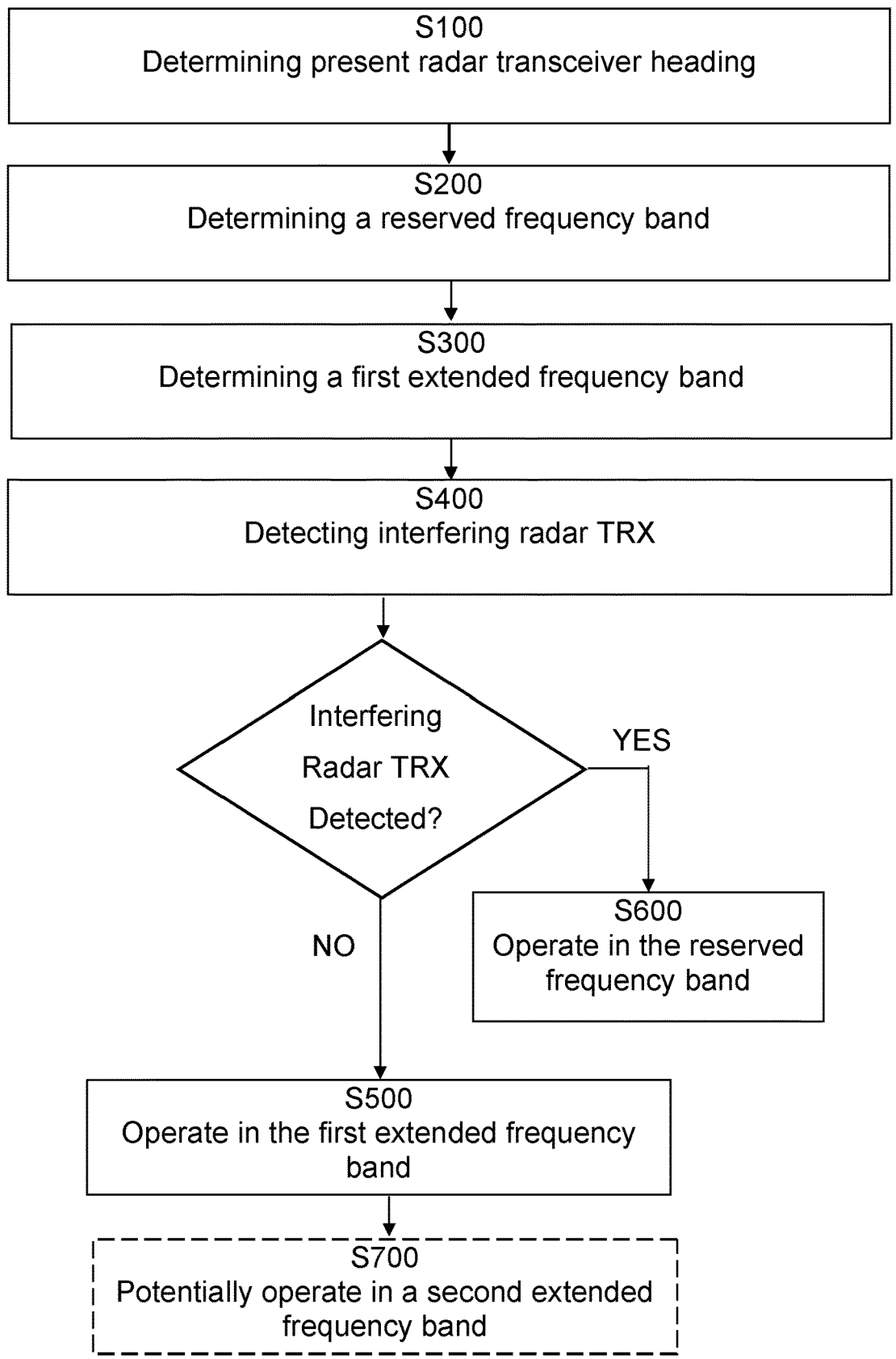
FIG. 8 is a flow chart illustrating methods.

With reference to FIG. 8, the present disclosure also relates to a method performed by a control unit 203 in a radar system 201 comprising a radar transceiver arrangement 202 with at least one ego radar transceiver 204. The method comprises the steps of:
  determining S100 a present direction $D$, $D_A$ of the ego radar transceiver 204,
  determining S200 a reserved frequency band B0 corresponding to the present direction $D$, $D_A$,
  determining S300 a first extended frequency band B1 comprising and extending beyond the reserved frequency band B0,
  detecting S400 presence of an interfering radar transceiver 401, 402 in the first extended frequency band,
  operating S500 the ego radar transceiver 204 in the first extended frequency band B1 in case an interfering radar transceiver is not detected in the first extended frequency band, and
  operating S600 the ego radar transceiver 204 in the reserved frequency band B0 otherwise.

The other features and capabilities of the herein disclosed radar systems, radar transceivers, and control units are also disclosed as corresponding methods. Thus, there is also disclosed herein radar systems, radar transceivers, and control units configured to perform any of the operations discussed above.

For example, the herein disclosed methods optionally also comprise determining S700 a second extended frequency band B2 comprising and extending beyond the first extended frequency band B1 as discussed above, and operating the ego radar transceiver in the second extended frequency band B2 in case an interfering radar transceiver is not detected while operating the ego radar transceiver 204 in the second extended frequency band B2 and to operate the ego radar transceiver 204 in the first extended frequency band B1 or in the reserved frequency band B0 otherwise.

While the above description constitutes the preferred embodiment of the present invention, it will be appreciated that the invention is susceptible to modification, variation and change without departing from the proper scope and fair meaning of the accompanying claims.

The invention claimed is:

1. A radar system for a vehicle, comprising a control unit and a radar transceiver arrangement with at least one ego radar transceiver, where, for the at least one ego radar transceiver, the control unit is adapted to:
  determine a present direction of the ego radar transceiver in dependence of a vehicle heading,
  determine a reserved frequency band corresponding to the present direction, and to
  determine a first extended frequency band comprising and extending beyond the reserved frequency band,
  wherein the control unit is further adapted to:
  detect presence of an interfering radar transceiver, and to operate the ego radar transceiver in the first extended frequency band in a first case wherein the interfering radar transceiver is not detected during operation of the ego radar transceiver in the first extended frequency band, and to operate the ego radar transceiver in the reserved frequency band in a second case wherein the interfering radar transceiver is detected during operation of the ego radar transceiver.

2. The radar system according to claim 1, wherein the control unit is further adapted to:
  determine a second extended frequency band comprising and extending beyond the first extended frequency band, and to operate the ego radar transceiver in the second extended frequency band in a third case wherein an interfering radar transceiver is not detected while operating the ego radar transceiver in the second extended frequency band and to operate the ego radar transceiver in the first extended frequency band or in the reserved frequency band in a third case wherein an interfering radar transceiver is detected while operating the ego radar transceiver in the second extended frequency band.

3. The radar system according to claim 2, wherein the first extended frequency band and the second extended frequency band excludes the reserved frequency band corresponding to a direction opposite to the present direction.

4. The radar system according to claim 1, wherein the control unit is adapted to generate a random outcome, and to detect presence of the interfering radar transceiver during radar operation in the first extended frequency band or in the second extended frequency band in dependence of the random outcome.

5. The radar system according to claim 1, wherein the ego radar transceiver is configured to avoid radar transmission at the same frequency and time instant as the interfering radar transceiver, wherein the control unit is adapted to detect presence of the interfering radar transceiver in the first extended frequency band or in the second extended frequency band in dependence of an interference level in a received radar signal of the ego radar transceiver.

6. The radar system according to claim 1, wherein the reserved frequency band is determined based on a center frequency corresponding to the direction and on a pre-configured reserved bandwidth.

7. The radar system according to claim 6, wherein the center frequency is given as a linear function of the direction.

8. The radar system according to claim 6, wherein the center frequency is given as a piecewise constant function of the direction.

9. The radar system according to claim 1, wherein the control unit is adapted to detect the presence of the interfering radar transceiver by monitoring a received radar signal of the ego radar transceiver.

10. The radar system according to claim 9, wherein the control unit is adapted to detect the presence of the interfering radar transceiver by measuring a noise floor level associated with the received signal.

11. The radar system according to claim 9, wherein the control unit is adapted to detect the presence of the interfering radar transceiver based on a difference between consecutive time domain samples of the received radar signal.

12. The radar system according to claim 1, wherein the control unit is adapted to perform signal repair of the received radar signal or to have a slanted polarization direction of the radar transceiver.

13. The radar system according to claim 1, wherein the control unit is adapted to determine the present direction by use of Global Navigation Satellite System, data, or by an electronic compass comprised in the radar system.

14. A method performed by a control unit in a radar system comprising a radar transceiver arrangement with at least one ego radar transceiver, the method comprising the steps of:
- determining a present direction of the ego radar transceiver,
- determining a reserved frequency band corresponding to the present direction,
- determining a first extended frequency band comprising and extending beyond the reserved frequency band,
- detecting the presence of an interfering radar transceiver in the first extended frequency band, and
- operating the ego radar transceiver in the first extended frequency band in a first case wherein an interfering radar transceiver is not detected in the first extended frequency band and
- operating the ego radar transceiver in the reserved frequency band in a second case wherein an interfering radar transceiver is detected in the first extended frequency band.

15. A vehicle comprising the radar system according to claim 1.

* * * * *